US008401026B2

(12) United States Patent
Raman et al.

(10) Patent No.: US 8,401,026 B2
(45) Date of Patent: Mar. 19, 2013

(54) ACHIEVING ABOUT AN EQUAL NUMBER OF ACTIVE LINKS ACROSS CHASSIS IN A VIRTUAL PORT-CHANNEL ENVIRONMENT

(75) Inventors: Pirabhu Raman, San Jose, CA (US); Sanjay Sane, Fremont, CA (US); Kalyan Ghosh, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 108 days.

(21) Appl. No.: 12/467,675

(22) Filed: May 18, 2009

(65) Prior Publication Data

US 2010/0290472 A1 Nov. 18, 2010

(51) Int. Cl.
*H04L 12/28* (2006.01)
(52) U.S. Cl. ....................................... 370/396
(58) Field of Classification Search .................. None
See application file for complete search history.

(56) References Cited

U.S. PATENT DOCUMENTS

| | | | | |
|---|---|---|---|---|
| 6,567,376 | B1* | 5/2003 | Karlsson et al. | 370/216 |
| 6,658,018 | B1* | 12/2003 | Tran et al. | 370/465 |
| 7,336,605 | B2* | 2/2008 | Bruckman et al. | 370/230 |
| 7,675,859 | B2* | 3/2010 | Takase et al. | 370/236.2 |
| 7,782,760 | B2* | 8/2010 | Froroth et al. | 370/216 |
| 7,835,291 | B2* | 11/2010 | Kotrla et al. | 370/242 |
| 7,881,230 | B2* | 2/2011 | Vinayagam et al. | 370/255 |
| 2002/0089691 | A1* | 7/2002 | Fertlitsch et al. | 358/1.15 |
| 2003/0061533 | A1* | 3/2003 | Perloff et al. | 714/9 |
| 2004/0146062 | A1* | 7/2004 | Parikh et al. | 370/419 |
| 2004/0158651 | A1* | 8/2004 | Fan et al. | 710/1 |
| 2004/0228278 | A1* | 11/2004 | Bruckman et al. | 370/231 |
| 2005/0259632 | A1* | 11/2005 | Malpani et al. | 370/351 |
| 2005/0265330 | A1* | 12/2005 | Suzuki et al. | 370/389 |
| 2005/0281191 | A1* | 12/2005 | McGee et al. | 370/216 |
| 2007/0025252 | A1 | 2/2007 | McGee et al. | |
| 2007/0237163 | A1 | 10/2007 | Kadambi et al. | |
| 2007/0248102 | A1* | 10/2007 | Wang et al. | 370/395.42 |
| 2008/0037418 | A1* | 2/2008 | Cole et al. | 370/220 |
| 2008/0037544 | A1* | 2/2008 | Yano et al. | 370/392 |
| 2008/0181196 | A1* | 7/2008 | Regan et al. | 370/351 |
| 2008/0205402 | A1 | 8/2008 | McGee et al. | |
| 2008/0205409 | A1 | 8/2008 | McGee et al. | |
| 2008/0240101 | A1* | 10/2008 | Shao et al. | 370/392 |
| 2010/0020680 | A1* | 1/2010 | Salam et al. | 370/225 |
| 2010/0097926 | A1* | 4/2010 | Huang et al. | 370/219 |
| 2010/0290469 | A1* | 11/2010 | Assarpour | 370/392 |
| 2010/0329147 | A1* | 12/2010 | Nam et al. | 370/254 |
| 2011/0032945 | A1* | 2/2011 | Mullooly et al. | 370/401 |
| 2011/0299551 | A1* | 12/2011 | Fiorone et al. | 370/401 |

OTHER PUBLICATIONS

PCT International Search Report dated Jul. 20, 2010, PCT Application No. PCT/US2010/035287.

* cited by examiner

*Primary Examiner* — Otis L Thompson, Jr.
(74) *Attorney, Agent, or Firm* — Weaver Austin Villeneuve & Sampson LLP (57) ABSTRACT

Two or more network devices can automatically coordinate to aggregate ports into virtual port channels. Ports of the port channel can be automatically assigned priorities to achieve about an equal distribution of active links across the two or more network devices.

20 Claims, 9 Drawing Sheets

ACHIEVING ABOUT AN EQUAL NUMBER OF ACTIVE LINKS ACROSS CHASSIS IN A VIRTUAL PORT-CHANNEL ENVIRONMENT

BACKGROUND OF THE INVENTION

1. Field of the Invention

The present invention generally relates to link aggregation technology. More specifically, the present invention provides techniques and mechanisms for efficiently aggregating physical links from two or more network devices into a single logical link.

2. Description of Related Art

Neighboring network devices in a network are typically interconnected through multiple physical links. For example, in an Ethernet network, multiple links may exist between two network devices. Each of the links connects a physical port from one device to a physical port of the other device.

In many instances, it may be beneficial to aggregate some of the physical links into logical links. That is, multiple physical links can be combined to form a logical interface to provide higher aggregate bandwidth, load balancing and link redundancy. When a packet is being transmitted over a logical link, it does not matter what particular physical link is being used as long as all the packets of a given flow are transmitted through the same logical link. If one physical link goes down, the logical link can still remain operational as long as there are other physical links present in the logical link. A logical link is also referred to herein as a port channel.

There continues to be a need for improved methods and mechanisms for efficiently managing logical links.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF EXAMPLE EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of Ethernet networks. However, it should be noted that the techniques of the present invention can be applied to different types of networks. In the following description, numerous specific details are set forth in order to provide a thorough understanding of the present invention. The present invention may be practiced without some or all of these specific details. In other instances, well known process operations have not been described in detail in order not to unnecessarily obscure the present invention. Furthermore, techniques and mechanisms of the present invention will sometimes be described in singular form for clarity. However, it should be noted that some embodiments can include multiple iterations of a technique or multiple instantiations of a mechanism unless noted otherwise. For example, a processor is used in a variety of contexts. However, it will be appreciated that multiple processors can also be used while remaining within the scope of the present invention.

Overview

According to the present invention, methods and apparatus are provided to allow efficient and effective aggregation of physical links from two or more network devices into one logical link or port channel. The port channel formed by such aggregation will be referred to herein as a virtual port channel ("vPC"), and the two or more network devices coordinating to form the logical link will be referred to herein as a virtual port channel complex ("vPC Complex"). In particular embodiments, the two or more network devices can set priorities of ports in such a way that the active links of the virtual port channel will automatically be about equally distributed across the network devices of the vPC Complex.

In one embodiment, a method for aggregating ports of two or more network devices into one joint or virtual port channel is provided that includes (i) establishing, at a first network device, a first port channel that forms part of a joint port channel in coordination with a second network device, wherein the joint port channel combines a plurality of links of the first port channel with a plurality of links of a second port channel of the second network device, wherein each of the links of the joint port channel are communicatively coupled with ports of a third network device, (ii) at the first network device, assigning a priority to each link in the first port channel such that a set of highest priority links will be about evenly divided between the first port channel and a second port channel, and (iii) communicating, from the first network device to the third network device, the priority of each link of the first port channel.

In a specific implementation, the coordination between the first network device and the second network device comprises identifying which of the first and second network devices is a primary network device and which of the first and second network devices is a secondary network device, wherein assigning the priority is based on whether the first network device is assigned as the primary network device or the secondary network device. In certain embodiments, the assigning a priority to each link in the first port channel comprises (i) determining a preestablished criteria to be used in establishing a set of priorities to be assigned to ports of the primary network device, (ii) determining the set of priorities based on the preestablished criteria, and (iii) assigning the priorities to a plurality of ports of the first network device. In another embodiment, the assigning a priority to each link in the first port channel comprises assigning a set of unique even numbers or a set of unique odd numbers based on whether the first network device is designated as a primary or secondary device. In certain embodiments, the coordination of the first network device and the second network device produces a virtual port channel complex, the virtual port channel complex communicating with the third network device to form the joint port channel. In another embodiment, the above described method further comprises (i) determining a plurality of links of the joint port channel to be given active status based at least in part on the priorities assigned to each link of the joint port channel, (ii) after determining which links will be active links, responding at the first network device to a failure of one of the active links at the first network device by reassigning the priorities assigned to the links of the first port channel, such that a set of highest priority links will still be about evenly divided between the first port channel and a second port channel, and (iii) after reassigning the priorities assigned to the links of the first port channel, communicating, from the first network device to the third network device, the reassigned priorities of the links of the first port channel. In certain embodiments, the above described method further comprises (i) determining a plurality of links of the joint port channel to be given active status based at least in part on the priorities assigned to each link of the joint port channel, and (ii) after determining which links will be active links, responding at the first network device to a failure of one of the active links of the second network device by delaying a synchronization process with the third network device for a predefined time period so that the second network device can use such predefined time period to reassign the priorities assigned to the links of the second port channel and communicate such reassigned priorities of the links of the second channel to the third network device.

In another embodiment, a network device is provided. The network device is a first network device in peer communication with a second network device, the first network device comprising memory, a plurality of ports, the plurality of ports coupled to a third network device through a plurality of ports of the third network device, and a processor, the processor configured to: (i) establish, at the first network device, a first port channel that forms part of a joint port channel in coordination with the second network device, wherein the joint port channel aggregates a plurality of links of the first port channel with a plurality of links of a second port channel of the second network device, wherein each of the links of the joint port channel are communicatively coupled with the plurality of ports of the third network device, (ii) at the first network device, assigning a priority to each link in the first port channel such that a set of highest priority links will be about evenly divided between the first port channel and a second port channel, and (iii) communicating, from the first network device to the third network device, the priority of each link of the first port channel.

In another embodiment, the invention pertains to a means plus function apparatus. In certain embodiments, the invention pertains to at least one computer readable storage medium having computer program instructions stored thereon that are arranged to perform one or more of the above described operations.

These and other features and advantages of the present invention will be presented in more detail in the following specification of the invention and the accompanying figures which illustrate by way of example the principles of the invention.

Specific Example Embodiments

As noted above, network devices in a network are typically interconnected using multiple physical links. For example, in an Ethernet network, multiple links may exist between two network devices. The physical links connecting a pair of network devices transmit data between the network devices.

In some instances, it may be beneficial to aggregate multiple physical links into a single logical link. Instead of having data transmitted through a particular physical link, the data can be transmitted over a particular logical link without regard to the particular physical link used. Some mechanisms exist for aggregating multiple physical links into a logical link or port channel. One protocol relating to such technology is the IEEE 802.3ad Ethernet standard, commonly referred to as the Link Aggregation Control Protocol ("LACP"). Such mechanisms allow aggregation of several links or ports into a logical link or port channel. Physical links are also referred to herein as physical interfaces and channels, while logical links are also referred to herein as logical interfaces and port channels.

The benefits obtained by such aggregation can be made even better if the physical links aggregated to form a logical link can come from two or more different network devices. For example, one may wish to combine physical links from two or more network devices into a single logical link. That is, in some circumstances, a network device A may have a plurality of physical links connecting it to a network device B. In addition, this "single" network device A may also have a plurality of physical links connecting it to another network device C. In some circumstances, it may be beneficial to aggregate some or all of the physical links connecting network device A to both network device B and C into one logical link or port channel. In other words, the aggregated logical link for network device A would include physical links from both network device B and C. Substantial benefits can be realized if link aggregation added device redundancy on top of link redundancy. However, conventional mechanisms for aggregating physical links into logical links do not provide means for such aggregation.

Consequently, the techniques and mechanisms of the present invention allow two or more network devices to coordinate together as a complex or group for purposes of forming a joint or virtual port channel that includes links from each of the two or more grouped network devices to another network device as further described below. The logical link or port channel formed by such aggregation is referred to herein as a "virtual port channel". Furthermore, the techniques and mechanisms of the present invention provide mechanisms for achieving an about equal distribution of active links across the two or more grouped network devices.

Certain embodiments of the present invention allow significant benefits. For example, the bandwidth of a logical link can be substantially increased by multiplying the number of available physical links, logical link-level resiliency can be improved by extending failover features present in other link aggregation mechanisms to a multiple device context, and the logical topology is loop free, thus in some examples reducing the need for reliance on the Spanning Tree Protocol, with its associated computational costs.

Furthermore, aggregating physical links belonging to two or more grouped network devices can provide device redundancy, and with that, hardware failure alternate paths. That is, data can still be transmitted over a virtual port channel even if a particular network device fails or becomes overloaded. This transmission reliability can be achieved because when a frame is being transmitted over a logical link, it does not matter what particular physical link is being used. Thus, as long as the physical links of the virtual port channel are distributed across the two or more grouped network devices, the logical link can remain operational even if a particular network device of the complex or grouping goes down.

The techniques and mechanisms of the present invention for achieving an about equal number of active links across the two or more grouped network devices of a virtual port channel, as well as other techniques and mechanisms relating to forming a virtual port channel, are described further below.

Figure 1:
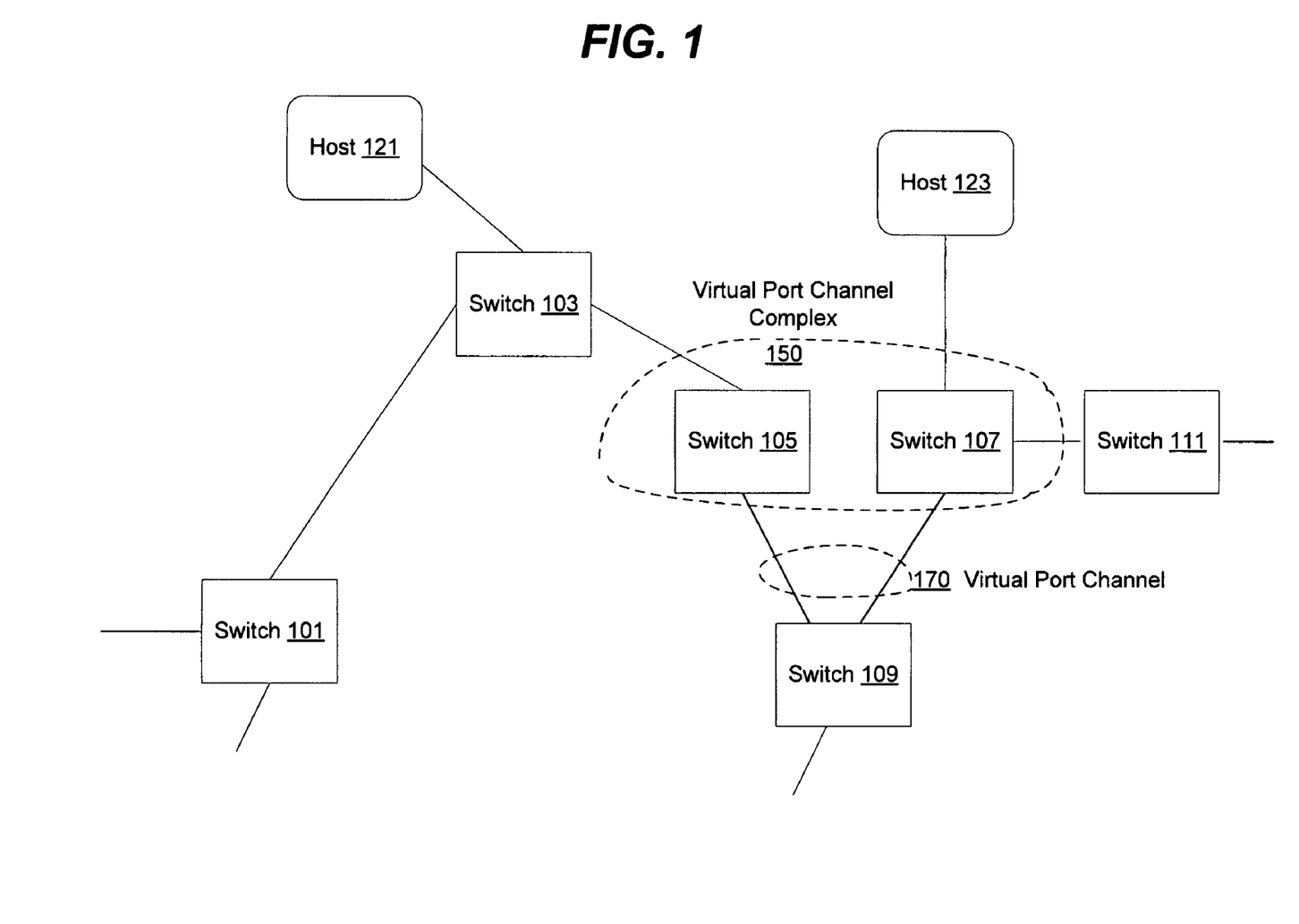
FIG. 1 shows an Ethernet network portion configured for link aggregation in accordance with a specific implementation of the present invention.

FIG. 1 shows an Ethernet network portion configured for link aggregation in accordance with a specific implementation of the present invention. As shown, the network may include switches 105 and 107 configured to aggregate physical links of into a virtual port channel 170. Although only two switches (e.g., 105 and 107) are shown as contributing to the aggregation of physical links, two or more switches are also contemplated as contributing to a particular virtual port channel. Additionally, it should be noted that FIG. 1 does not depict the entire network, but shows a portion of the network. In one embodiment, hosts 121 and 123 may be configured as a server and/or client system.

Each of the switches may be connected to neighboring entities either through individual physical links or through multiple physical links configured as logical links or port channels. Switches 105 and 107 may also connect to neighboring switch 109 through virtual port channel 170. As members of virtual port channel complex 150, switches 105 and 107 may coordinate to form virtual port channel 170 to switch 109. The network may include any suitable number and type of network devices. In the illustrated embodiment, switch 105 is also coupled to switch 103, as well as to switch 109. Switch 107 is also coupled to switch 111 and host 123, as well as switch 109. In alternative embodiments, not pictured in FIG. 1, more than one virtual port channel 107 may exist between the virtual port channel complex 150 and switch 109.

Figure 2:
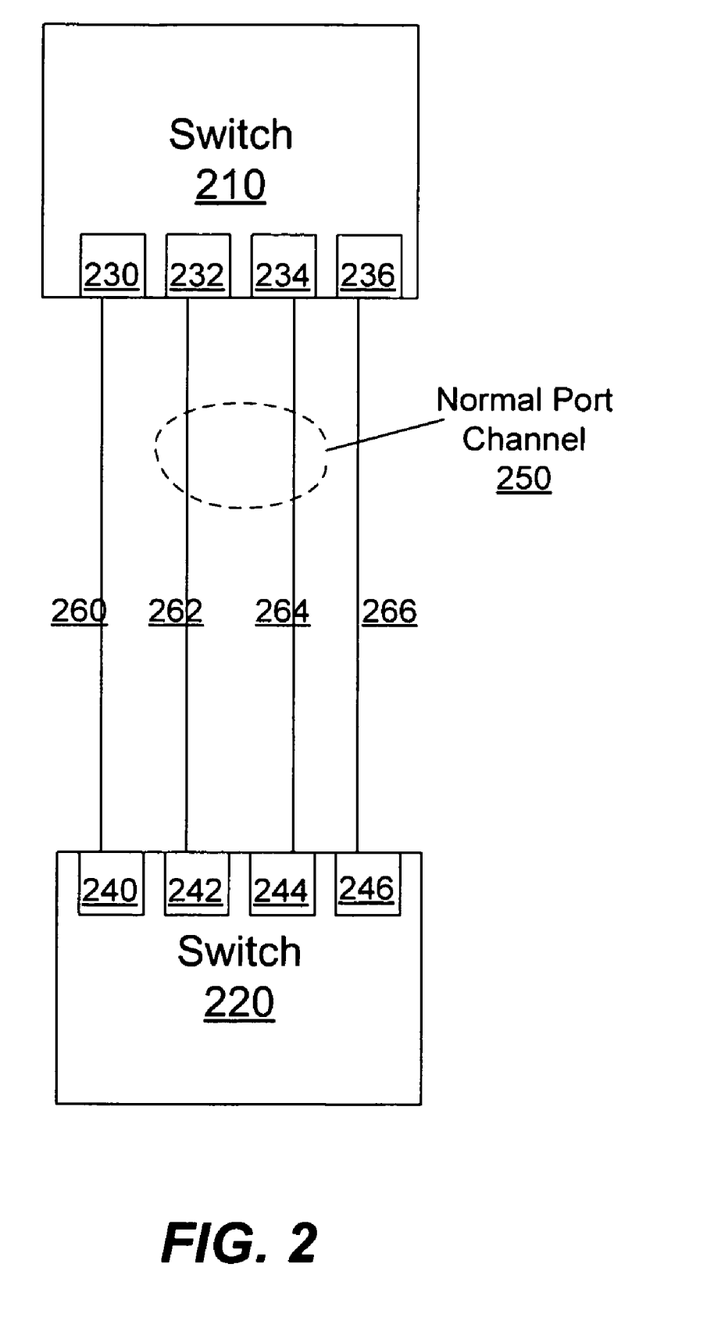
FIG. 2 is a diagrammatic representation showing link aggregation between two individual switches and associated ports in accordance with one embodiment of the present invention.

A simple link aggregation between two network devices will first be described prior to describing a more complex link aggregation. FIG. 2 is a diagrammatic representation showing link aggregation between two switches, such as any two switches shown in FIG. 1 in accordance with one embodiment of the present invention. Switch 210 depicted in FIG. 2 includes ports 230, 232, 234, and 236. Switch 220 includes ports 240, 242, 244, and 246. These ports are physical ports, and the links connecting them are physical links. Port 230 of switch 210 is coupled to port 240 of switch 220 through an individual physical link or channel 260. Connected ports are also referred to herein as peer ports. Port 232 of switch 210 is coupled to port 242 of switch 220, and port 234 of switch 210 is coupled to port 244 of switch 220. The two resulting physical links 262 and 264 can be aggregated to form port channel 250. Port channel 250 is labeled as a "Normal Port Channel" in FIG. 2 to distinguish it from the virtual port channels depicted in later Figures. Likewise, port 236 of switch 210 is coupled to port 266 of switch 220 through physical link 266. Individual physical links or channels 260 and 266 are not aggregated. In alternative embodiments, there can be more than one link aggregation formed between switch 210 and switch 220.

Figure 3:
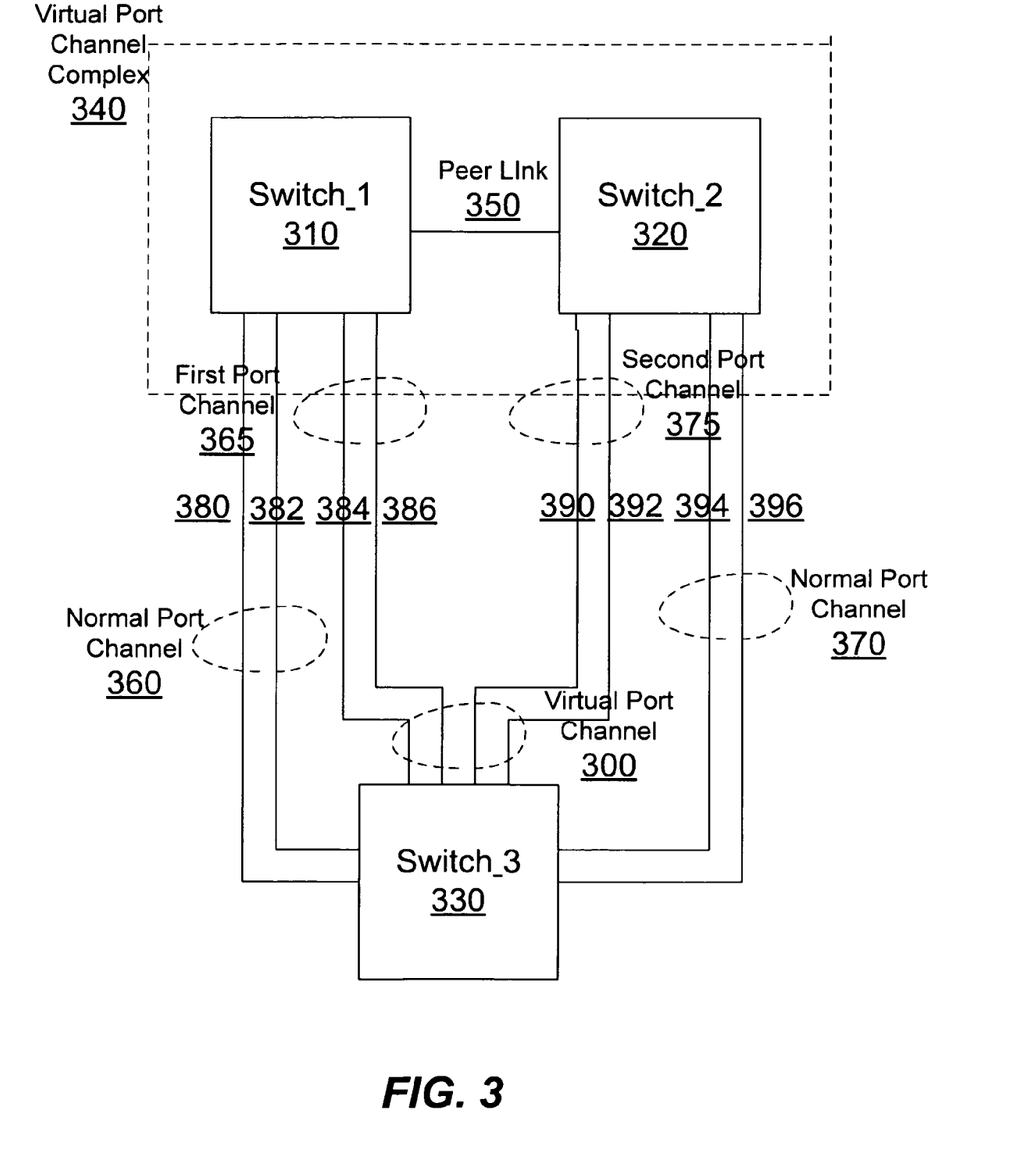
FIG. 3 is a diagrammatic representation showing examples of link aggregation with a virtual port channel complex and in accordance with one embodiment of the present invention.

FIG. 3 is a diagrammatic representation showing examples of link aggregation with a virtual port channel complex 340 in accordance with one embodiment of the present invention. In general, example techniques of the present invention aggregate a plurality of links from two (or more) network devices to form a logical link or port channel to another network device. As shown in FIG. 3, the virtual port channel complex ("vPC Complex) 340 comprises switch_1 310 and switch_2 320. Switch_1 310 and Switch_2 320 can coordinate with each other to form virtual port channel 300 to another Switch_3 330.

Although the ports of the switches of FIG. 3 are not depicted, they exist at Switch_1, Switch_2 and Switch_3, at each end of physical links 380, 382, 384, 386, 390, 392, 394, and 396, in the same manner shown in FIG. 2. In this example, the vPC Complex 340 includes eight ports: four at Switch_1 and four at Switch_2. Switch_3 includes eight ports in this illustrated example. Individual ports of both Switch_1 and Switch_2 are connected to individual ports of Switch_3 through individual physical links or channels.

In one arrangement, the vPC Complex depicted in FIG. 3 can be connected to Switch_3 through four physical links 384, 386, 390, and 392. The physical links 384 and 386 emanating from Switch_1 can be configured as a first port channel 365. The physical links 390 and 392 emanating from the Switch_2 can be configured as a second port channel 375. The first port channel 365 and the second port channel 375 can be configured to form virtual port channel 300. That is, in particular embodiments, the plurality of links from the Switch_1 and Switch_2 can first be configured into a first port channel 365 and a second port channel 375, and then be configured as virtual port channel 300. In alternative embodiments, physical links 384, 386, 390, and 392 may be configured as virtual port channel 300 without needing to previously be configured as first port channel 365 and second port channel 375.

A virtual port channel complex may be connected to another device through a virtual port channel and a normal port channel at the same time. As shown, Switch_1 can also be connected to Switch_3 through a normal port channel 360. Likewise, Switch_2 can be connected to Switch_3 through normal port channel 370. The port channels 360 and 370 are described as being normal because they can be formed using other link aggregation technology, including conventional link aggregation technology. In alternate embodiments, not pictured, any pair of switches may also be connected to each other through individual physical links.

While Switch_1 and Switch_2 can cooperate to form virtual port channels, they can in other respects operate largely independently. In particular embodiments, Switch_1 and Switch_2 have a distributed control plane, distributed data plane and distributed management. This distributed nature can provide advantages of scalability and simplicity of implementation.

Peer link 300 is an interswitch link ("ISL") that connects first local switch 310 and second local switch 320. Peer link 350 can be used to communicate information between the control planes of Switch_1 and Switch_2 so as to carry out any suitable peer functions of the vPC Complex. In particular embodiments, among other communications, peer link 350 can carry a heartbeat mechanism between Switch_1 and Switch_2 that communicates state information regarding the links of the virtual port channel. In alternative embodiments, the information conveyed by peer link 350 is conveyed through other mechanisms (e.g., wirelessly or indirectly through other devices), and peer link 350 is not necessary.

In some examples, network devices or switches can exchange protocol data units ("PDUs") as part of the process for establishing a virtual port channel. These PDUs and other similar packets for communicating protocol related data are referred to herein as link aggregation protocol packets. The link aggregation protocol packets can communicate data necessary for establishing compability as well as parameters necessary for establishing the virtual port channel 300. In one example, they provide link advertisement, and priority messages. They can be sent between the partner physical ports of each physical link between a switch or device of the vPC Complex (e.g., 340) and another switch (e.g., Switch_3).

The link aggregation protocol packets can then include parameters such as a system identifier, port identifiers, port channel identifiers, a channeling intent, and a channeling status. A channeling intent parameter can indicate to the peer port if the port intends to participate in a port channel, or otherwise as an individual port. The channeling status parameter can inform the peer port about the sending port's current channeling status. This parameter is exchanged by the attached peer ports to agree upon the channeling status of the link and to ensure that both ends are synchronized.

Figure 4A:
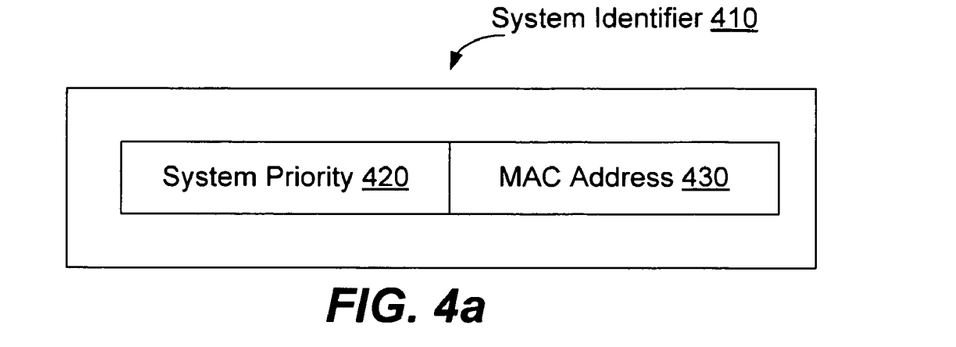
FIG. 4a is a diagrammatic representation of system identifiers.

Each network device or switch can be configured with a particular system identity and system priority. As shown in FIG. 4a, for example, each device can be associated with a system identifier 410, which is comprised of the concatenation of a system priority 420 and a MAC address 430. As shown in FIG. 4a, in some embodiments, the system identifiers 410 are globally unique identifiers, such as a switch priority number 420 concatenated with a global media access control (MAC) address 430.

Figure 4B:
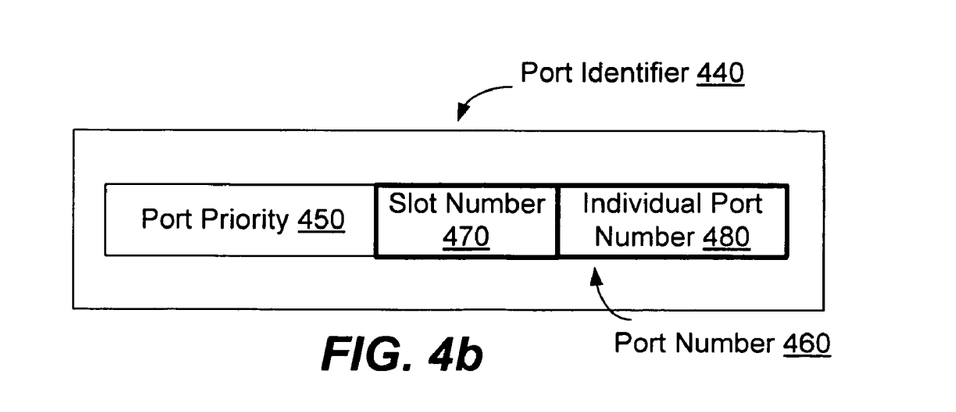
FIG. 4b is a diagrammatic representation of port identifiers.

Each port can also be associated with port identifiers. FIG. 4b is a diagrammatic representation of port identifiers 440. As shown, in some embodiments, port identifiers 440 can take the form of port specific identifiers, such as a port priority 450 concatenated with a port number 460. The port number itself can be a slot (or line card) number 460 concatenated with an individual port number 470. The port priority 450 can be chosen from among a range of values, or can have a given default value. Port priority 450 can be user configurable and can be set by a system administrator. In one implementation, the port priority 450 can comprise the higher numerical value digits of port identifiers 440.

Each port channel can also be associated or configured with identifiers. In some examples, each port channel has a port channel identifier for each port of the channel. According to various embodiments, each port channel identifier is a unique number within the network device or switch.

In particular embodiments, links can be selected for active status based on which links have the lowest port identifier 440 associated with them. The assignment of values to port identifiers 440 can, thus, determine the order in which ports are selected for active status. In particular embodiments, port identifiers can be used to facilitate automatic selection of links for active status. Such automatic selection can include assigning a value to port priority 450 of port identifier 440, as described further below.

In particular embodiments, the techniques and mechanisms of the present invention use system identifiers 410 to present a virtual port channel complex 340 as a single network device for purposes of establishing a logical link with another network device. For example, in the exchange of PDUs described above to establish a logical link, the virtual port channel complex may wish to present itself as a single entity, rather than as its constituent network devices. In some embodiments, this result is achieved by assigning a new system identifier (e.g. 410) to the virtual port channel complex and presenting itself to another network device, such as Switch_3 330, using the new system identifier. Specifically, rather than communicating to another network device the respective system identifiers of its constituent network devices, a virtual port channel complex can present a new system identifier including a new MAC address and/or a new system priority. The constituent network devices cooperate to communicate the virtual port channel complex's system identifier 410 to the other network device.

In particular embodiments, the virtual port channel is formed in part by operating via an existing protocol standard such as the Link Aggregation Protocol Standard ("LACP"), IEEE 802.3ad. In particular embodiments, the techniques and mechanisms of the present invention achieve relative ease of implementation and scalability by building on such existing link aggregation technology. Presenting the devices of the vPC Complex as a single entity can also enable techniques of the present invention to be used with conventional mechanisms for link aggregation such as LACP.

Port priorities can be manually configurable, but such manual processes are cumbersome, time consuming and can be prone to error. The techniques and mechanisms of the present invention, as described further below, provide a way to configure port priorities of the virtual port channel 300 automatically.

Figure 5:
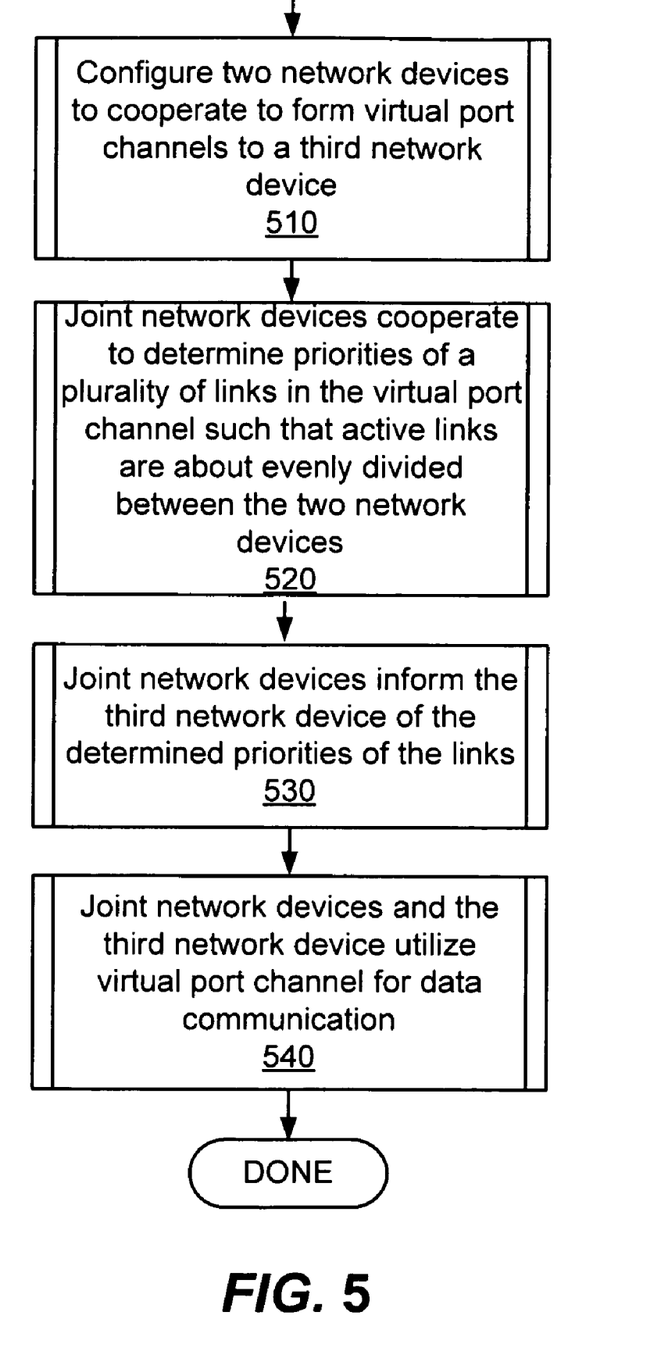
FIG. 5 is a flow process diagram showing a technique for aggregating physical links from two network devices to form a virtual port channel in which active links are evenly distributed across the devices of the virtual port channel complex in accordance with one embodiment of the present invention.

FIG. 5 is a flow process diagram showing a technique for aggregating two network devices in accordance with one embodiment of the present invention. This flow process shows one embodiment for forming a virtual port channel, and for assigning priorities to the ports of the virtual port channel complex in order to achieve an about equal number of active links across the joint network devices of the virtual port channel complex. In the first step 510 of the process depicted in FIG. 5, two network devices are configured to form a virtual port channel to a linked network device (referred to as the third network device in FIG. 5). The two network devices can constitute a vPC Complex. This first step 510 can include determining a common system identifier for the vPC Complex. It can also include enabling a vPC feature at both joint network devices, and establishing a vPC peer link. In addition, the first step 510 can include messages being exchanged between the two joint network devices. The first step 510 can also include the two joint network devices providing a copy of their switch configurations to the linked network device to determine whether any configuration inconsistencies exist between the vPC complex network devices and the linked network device that need to be addressed prior to starting the virtual port channel. The first step 510 can also include addressing any consistency problems and establishing that any required protocols are in sync.

In the second step 520 of the process depicted in FIG. 5, the two joint network devices can cooperate to determine priorities of a plurality of links in the virtual port channel such that active links are about evenly divided between the two joint network devices. This second step 520 can include identifying which of the two joint network devices is the primary system, and which is the secondary system, and determining a preestablished criteria to be used in establishing a set of priorities to be assigned to ports of the primary network device and the secondary network device. This second step 520 can also include determining the set of priorities based on the preestablished criteria, and assigning the set of priorities to a plurality of ports of the first and second network devices.

In the third step 530 of the process depicted in FIG. 5, the two joint network devices can inform a linked network device of the determined priorities of the links. In particular embodiments, this communication can be performed by assigning priority values corresponding to the determined priorities to a port identifier, and including the respective port identifiers and the common system identifier in link aggregation protocol packets sent by the vPC Complex to a linked network device, such as Switch_3 of FIG. 3.

In the fourth step 540 of the process depicted in FIG. 5, the two joint network devices and the linked network device can utilize the virtual port channel for data communication.

Figure 6:
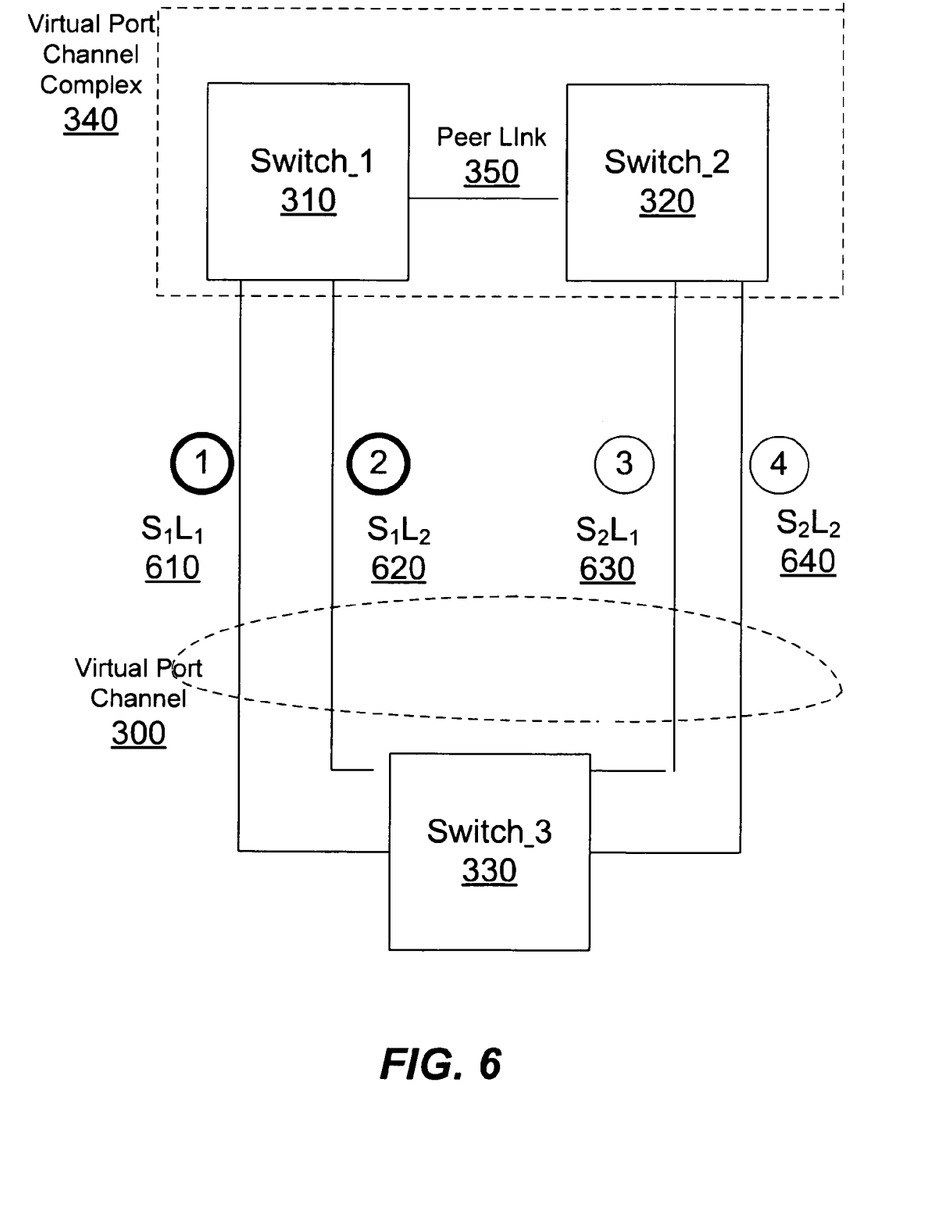
FIG. 6 is a diagrammatic representation showing link aggregation between a virtual port channel complex and a switch, along with rankings indicating a typical order of selection of active links, in accordance with one embodiment of the present invention.

FIG. 6 is a diagrammatic representation showing link aggregation between Switch_1 and Switch_2 of virtual port channel complex 340 and Switch_3, along with priority rankings indicating a typical selection of active links, in accordance with one embodiment of the present invention. With the LACP protocol used on Ethernet networks, for example, if ports 1/1-8 (Ports 1-8 of Slot 1) are configured in a port channel, ports 1/1-8 will be preferred for active status over ports 2/1-8 (Ports 1-8 of Slot 2). According to the conventions of LACP, ports with a lower port identifier 440 are selected first for bundling.

While of concern in the context of a single chassis, this ranking result becomes even more problematic in the context of, for example, two grouped network devices cooperating as a vPC Complex. For example, without a different port identifier 450 configuration, ports from an active chassis can consistently be preferred for use as active links over ports from a standby network device. Such a configuration fails to take advantage of the device redundancy benefits conferred by forming a port channel comprising physical links that are evenly distributed among two (or more) joint network devices of a vPC complex.

The intelligent assignment of port priorities can be used to overturn the usual ranking order. In particular embodiments, interleaving of port priorities can solve the problem described above. It can be readily perceived that a number of possibilities exist for assigning port priority in such a way as to use port identifiers to reflect a desired ranking order.

FIG. 6 shows the operation of a virtual port channel system operating without the mechanisms and techniques of the present invention. For purposes of illustration, in FIG. 6, the system depicted is one in which the maximum number of active links is two, and the maximum number of standby links is two, although typically more active links would be utilized. Virtual port channel 300 contains four physical links. Link 610 is designated $S_1L_1$ to indicate the first link of Switch_1 310; link 620 is designated $S_1L_2$ to indicate the second link of Switch_1 310, etc. Assuming that the techniques and mechanisms of the present invention are not applied, for the reasons discussed above, the ranking order indicated by numbers (1) through (4) indicated by circled numbers would result. That is, link $S_1L_1$ would be ranked first, and link $S_1L_2$ would be ranked second. Link $S_2L_1$ would be ranked third, while link $S_2L_2$ would be ranked fourth. With this ranking, and assuming that the maximum number of active links is two, and the maximum number of standby links is two, link $S_1L_1$ and link $S_1L_2$ would be designated as the active links. In other words, all of the active links would be from one network device.

Figure 7:
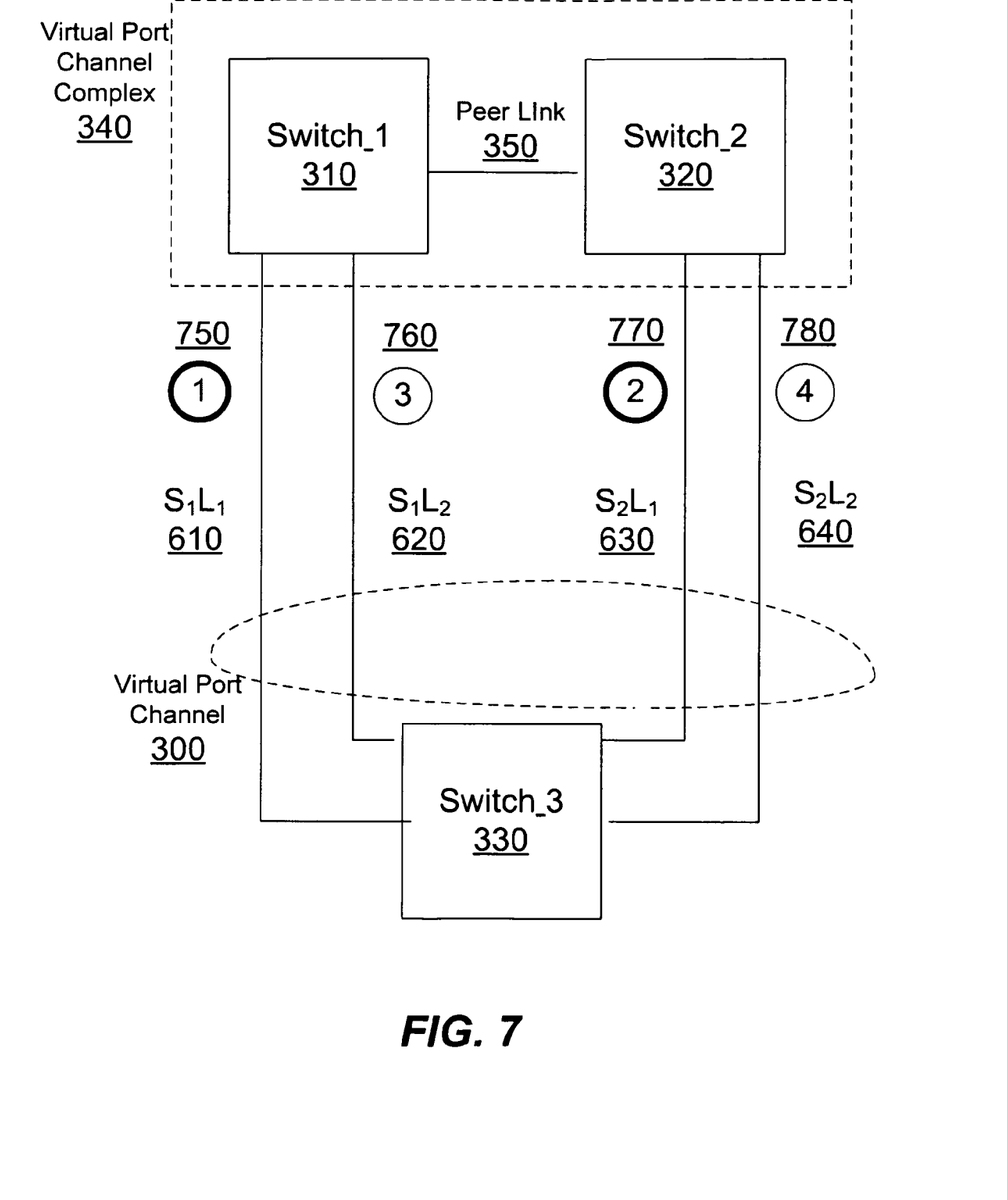
FIG. 7 is a diagrammatic representation showing link aggregation between a virtual port channel complex and an individual switch, along with rankings indicating an order of selection of active links with respect to various example techniques of the present invention.

FIG. 7 is a diagrammatic representation showing link aggregation between an individual switch and a virtual port channel complex, along with priority rankings reflecting a selection of active links of the virtual port channel in accordance with one embodiment of the present invention. With these rankings, the selected active links would be about evenly distributed among the switches of the vPC complex. Assuming that the techniques and mechanisms of the present invention are applied, the ranking order (1) through (4) indicated by the circled numbers would result. Link $S_1L_1$ of Switch_1 would be ranked first with ranking (1), while link $S_1L_2$ of Switch_1 would only be ranked third (3). Link $S_2L_1$ of Switch_2 would be ranked second (2), while link $S_2L_2$ of Switch_2 would be ranked fourth (4). With this ranking, and assuming that the maximum number of active links is two, and the maximum number of standby links is two, the links that are circled in bold—that is, links $S_1L_1$ and $S_2L_1$—would be designated as the active links.

The assignment of port priorities for a vPC Complex may be achieved through numerous mechanisms. In one example, the constituent network devices may first need to determine between themselves which network device is the primary system and which network device is the secondary system. This determination may be made automatically based upon a preestablished criteria, such as who has the lower device MAC address 430 or device system identifier 410. Once a primary system and secondary system have been determined, the network devices may look up a preestablished set of port priorities and choose a set of port priorities based on whether it is the primary system or the secondary system. Having determined the applicable set of port priorities, it may then proceed to assign individual port priorities to each of its vPC ports drawing from its set of port priorities. Port priorities may be assigned in a manner such that each port will have a unique port priority.

In particular embodiments, the vPC Complex devices may then advertise through the link aggregation protocol packets the priorities of each of its individual vPC ports to its partner network device, that is, the linked device at the other end of the virtual port channel. This information can be sent through link aggregation protocol packets. Once it receives the link aggregation protocol packets, the partner network device can assign to its physical port that received the link aggregation protocol packet the same port priority as that of its counterpart vPC Complex port. For example, a first network device may advertise a priority of one for slot1/port1. The corresponding port of the partner network device may then be assigned this same port priority.

In particular embodiments, the port priority information may then be used by the partner network device for selecting links for active status. In particular embodiments, this selection may be conducted according to preexisting techniques such as those in LACP for determining active links. Under LACP, links are selected to be bundled as active links if they have a numerically lower port identifier. That is, a port with the lowest port identifier is selected first, then the port with the next lowest port identifier is selected, etc.

Assuming a virtual port channel complex composed of two network devices, in particular embodiments, a system is implemented in which ports of a first network device (e.g., the primary device) are assigned odd numbers (i.e., 1, 3, 5, 7, etc.) and ports of a second network device (e.g., the secondary device) are assigned even numbers (i.e., 2, 4, 6, 8, etc). Then using the provided features of LACP, an approximately equal distribution of active links across the member network devices of the vPC Complex can be achieved. Particular embodiments combine these automatic selection features of LACP with the port priority assignment features described above to achieve an even distribution of active links.

In other words, the port priorities of the vPC Complex could be assigned in a manner such that ports of Switch_1 are interleaved in priority with ports of Switch_2. For example, in one embodiment, the LACP port priorities are configured as follows:

Priority of 1/1=1 Priority of 2/1=2
Priority of 1/2=3 Priority of 2/2=4
Priority of 1/3=5 Priority of 2/3=6
...
Priority of 1/7=13 Priority of 2/7=14
Priority of 1/8=15 Priority of 2/8=16

With this prioritization, ports 1/1-4 and 2/1-4 would be bundled, and ports 1/5-8 and 2/5-8 would be standby. An example of how this prioritization scheme could work in a system with only four total links, and a maximum number of active links of two, and a maximum number of standby links of two, is shown in FIG. 7. The links with priority numbers that are circled in bold (links $S_1L_1$ and $S_2L_1$) would be designated as the active links, thus achieving the sought after about equal number of active links across the two or more network devices.

Figure 8:
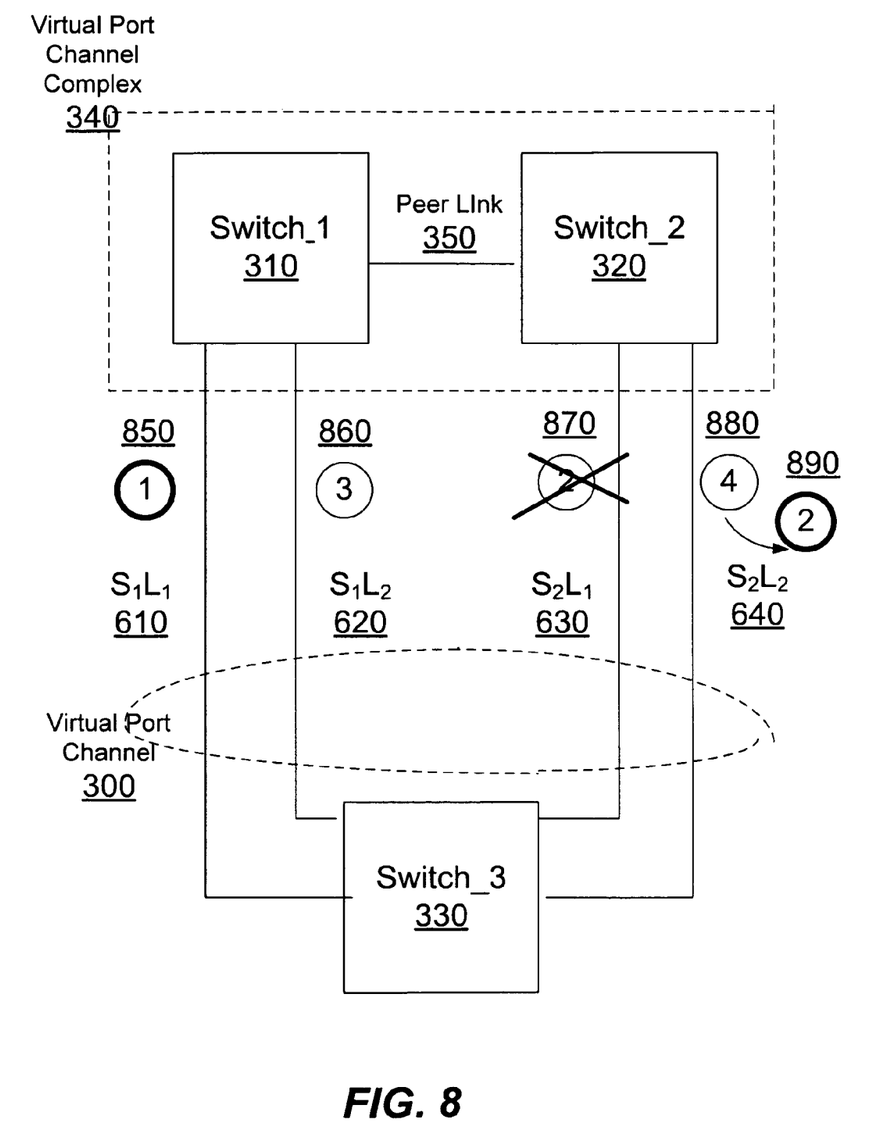
FIG. 8 is a diagrammatic representation showing link aggregation between a virtual port channel complex and an individual switch, along with rankings indicating a reordering of the order of selection of active links following link failure, in accordance with one embodiment of the present invention.

FIG. 8 is a diagrammatic representation showing link aggregation between an individual switch and a virtual port channel complex, along with an adjusted ranking order produced by techniques of the present invention when one of the physical links of the virtual port channel goes down in accordance with a specific implementation of the present invention. For example, the techniques and mechanisms of the present invention may not be merely limited to initial link selection. In cases of link failure, particular embodiments can provide a mechanism for reassigning port priorities of the vPC network device containing the failed link so as to preserve the about even distribution of active links across the network devices of the vPC Complex.

In particular embodiments, if a link goes down, a network device can take the port priority from the link that failed and assign such priority to another of its link. For instance, in the example shown in FIG. 8, when active link $S_2L_1$ of Switch_2, which had a priority of (2), fails, such Switch_2 can reassign priorities of its vPC ports such that the link that formerly had a priority of (4) will now have a priority of (2). This reassignment process can involve a similar process to that used in initially assigning port priorities to the vPC ports.

Additionally, mechanisms may also be provided for the switch that is not experiencing a failing link (e.g., Switch_1) of the vPC Complex 340 to delay the synchronization process for a preestablished period of time in order to ensure that the links of Switch_2 have sufficient time to complete the process of reassigning port priorities as described above.

As shown in FIG. 8, Switch_3 may respond to the link failure of $S_2L_1$ by sending a message to Switch_1 to make link $S_1L_2$, which has a priority of (3), an active link. The Switch_1 may check to see if Switch_2 has had a link go down (e.g., via peer communication). If Switch_1 determines that Switch_2 had a link fail, Switch_1 may then introduce a delay of a preestablished length of time to give Switch_2 time to reconfigure its port assignments. After the preestablished period of delay, Switch_1 may respond in the negative to the Switch_3's request to make link $S_1L_2$ active. Switch_3 can then go through its selection process again, and this time can select link $S_2L_2$, which has a priority of (2) after Switch_2's reconfiguring of priority assignments. The new priority would result in the links circled in bold (that is, links $S_1L_1$ and $S_2L_2$) being now designated as active links. Such a configuration would achieve an about equal number of active links across the two network devices of the vPC complex.

As described above, techniques for aggregating ports may be performed in a variety of network devices or switches. According to various embodiments, a switch includes a processor, network interfaces, and memory. A variety of ports, Media Access Control (MAC) blocks, and buffers can also be provided as will be appreciated by one of skill in the art. In addition, although exemplary switches are described, the above-described embodiments may be implemented in a variety of network devices (e.g., servers) as well as in a variety of mediums.

Figure 9:
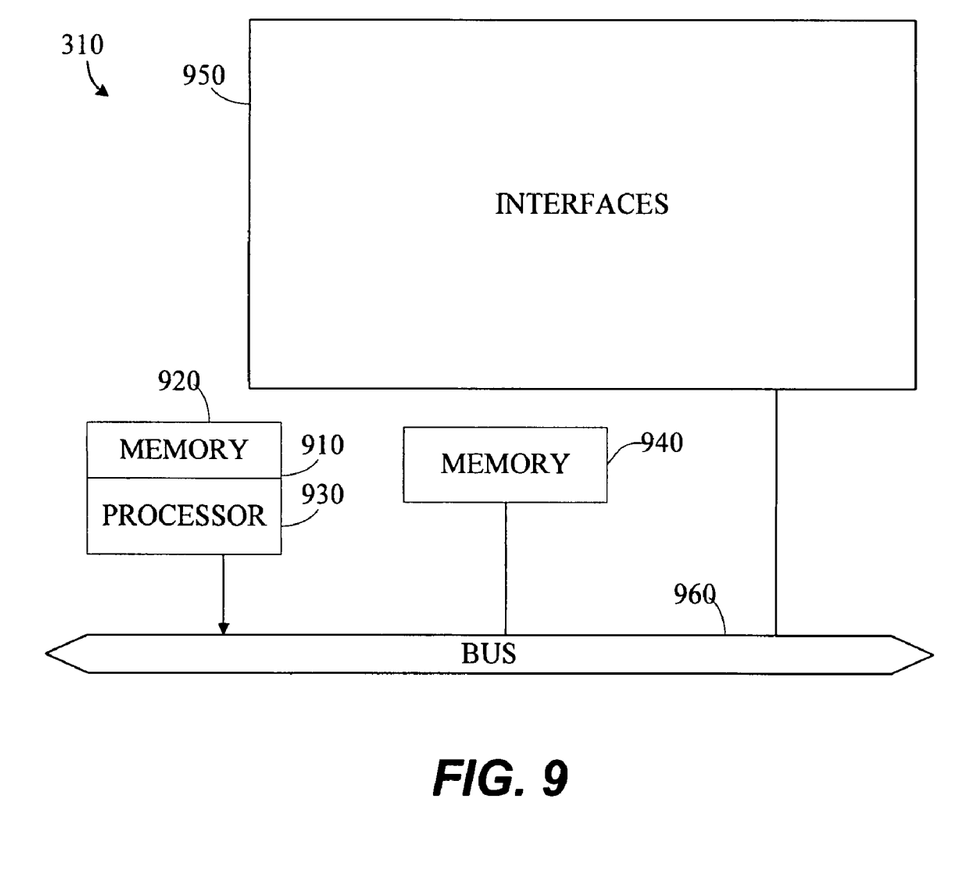
FIG. 9 illustrates an example switch suitable for implementing embodiments of the present invention.

Referring now to FIG. 9, a switch 310 suitable for implementing embodiments of the present invention includes a master central processing unit (CPU) 910, interfaces 950, and a bus 960 (for example, a PCI bus). When acting under the control of appropriate software or firmware, the CPU 910 is responsible for such tasks as switching and/or routing computations and network management. It preferably accomplishes all these functions under the control of software including an operating system (for example, the Internetwork Operating System (IOS®) of Cisco Systems, Inc.) and any appropriate applications software. CPU 910 may include one or more processors 930 such as a processor from the Motorola family of microprocessors or the MIPS family of microprocessors. In an alternative embodiment, processor 930 is specially designed hardware for controlling the operations of switch 310. In a specific embodiment, a memory 920 (such as non-volatile RAM and/or ROM) also forms part of CPU 910. However, there are many different ways in which memory could be coupled to the system. Memory block 910 may be used for a variety of purposes such as, for example, caching and/or storing data, programming instructions, etc.

The interfaces 950 are typically provided as interface cards (sometimes referred to as "line cards"). Generally, they control the sending and receiving of packets or packet segments over the network and sometimes support other peripherals used with the switch 310. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching and/or routing, media control and management. By providing separate processors for the communications intensive tasks, these interfaces allow the master microprocessor 910 to efficiently perform switching and/or routing computations, network diagnostics, security functions, etc.

Although the system shown in FIG. 9 is one specific switch of the present invention, it is by no means the only switch architecture on which the present invention can be implemented. For example, an architecture having a single processor that handles communications as well as switching and/or routing computations, etc. is often used. Further, other types of interfaces and media could also be used with the switch.

Regardless of a network device's configuration, it may employ one or more memories or memory modules (such as, for example, memory block 940) configured to store data, program instructions for the general-purpose network operations and/or the inventive techniques described herein. The program instructions may control the operation of an operating system and/or one or more applications. The memory or memories may also be configured to store fair share values and parameters, burst thresholds, minimum and maximum thresholds, option selection bits, class parameters/specifications, timers, queue characteristics, packet arrival history parameters, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of network protocols and architectures. It is therefore intended that the invention be interpreted to include all variations and equivalents that fall within the true spirit and scope of the present invention.

What is claimed is:

1. A method comprising:

establishing, at a first network device, a first port channel that forms part of a joint port channel in coordination with a second network device, the first and second network devices having separate control planes, wherein the joint port channel combines a plurality of links of the first port channel with a plurality of links of a second port channel of the second network device, wherein each of the links of the joint port channel are communicatively coupled with ports of a third network device, wherein at least one link of the joint port channel has inactive status, an inactive status link being one that is acting as a back up to one or more active status links, wherein a determination of links of the joint port channel to be given active status is based at least in part on priorities assigned to the links of the joint port channel;

at the first network device, assigning a priority to each link in the first port channel, the priorities assigned such that at least one link of the first port channel and at least one link of the second port channel are assigned active status in the operation of the joint port channel; and communicating, from the first network device to the third network device, the priority of each link of the first port channel.

2. The method of claim 1, wherein the coordination between the first network device and the second network device comprises identifying which of the first and second network devices is a primary network device and which of the first and second network devices is a secondary network device, wherein assigning priorities is based at least in part on whether the first network device is assigned as the primary network device or the secondary network device.

3. The method of claim 1, wherein the assigning a priority to each link in the first port channel comprises determining a set of priorities to be assigned to ports of the first network device; and assigning one or more of the priorities to a plurality of ports of the first network device, the plurality of ports coupled to the plurality of links of the first port channel.

4. The method of claim 1, wherein the assigning a priority to each link in the first port channel comprises determining a preestablished criteria to be used in establishing a set of priorities to be assigned to ports of the first network device; determining the set of priorities based on the preestablished criteria; and assigning the priorities to a plurality of ports of the first network device.

5. The method of claim 1, wherein the assigning a priority to each link in the first port channel comprises assigning a set of unique even numbers or a set of unique odd numbers.

6. The method of claim 5, wherein the assigning of a set of unique even numbers or a set of unique odd numbers is based on whether the first network device is designated as a primary or secondary device.

7. The method of claim 1, wherein the coordination of the first network device and the second network device produces a virtual port channel complex, the virtual port channel complex communicating with the third network device to form the joint port channel.

8. A method of claim 1, further comprising:

responding at the first network device to a failure of one of the active links at the first network device by reassigning the priorities assigned to the links of the first port channel, such that at least one link of the first port channel and at least one link of the second port channel are still assigned active status in the operation of the joint port channel; and after reassigning the priorities assigned to the links of the first port channel, communicating, from the first network device to the third network device, the reassigned priorities of the links of the first port channel.

9. A method of claim 1, further comprising:

after a determination is made concerning which links of the joint port channel are to be given active status, the determination based at least in part on the priorities assigned to each link of the joint port channel, responding at the first network device to a failure of one of the active links of the second network device by delaying a synchronization process with the third network device for a predefined time period so that the second network device can use such predefined time period to reassign the priorities assigned to the links of the second port channel and communicate such reassigned priorities of the links of the second channel to the third network device.

10. A first network device in peer communication with a second network device, the first network device comprising:

memory, a plurality of ports, the plurality of ports communicatively coupled to a third network device through a plurality of ports of the third network device, and a processor, the processor configured to:

establish, at the first network device, a first port channel that forms part of a joint port channel in coordination with the second network device, the first and second network devices having separate control planes, wherein the joint port channel aggregates a plurality of links of the first port channel with a plurality of links of a second port channel of the second network device, wherein each of the links of the joint port channel are communicatively coupled with a plurality of ports of the third network device, wherein at least one link of the joint port channel has inactive status, an inactive status link being one that is acting as a back up to one or more active status links, wherein a determination of links of the joint port channel to be given active status is based at least in part on priorities assigned to the links of the joint port channel;

at the first network device, assign a priority to each link in the first port channel, the priorities assigned such that at least one link of the first port channel and at least one link of the second port channel are assigned active status in the operation of the joint port channel; and communicate, from the first network device to the third network device, the priority of each link of the first port channel.

11. The network device of claim 10, wherein the coordination between the first network device and the second network device comprises identifying which of the first and second network devices is a primary network device and which of the first and second network devices is a secondary network device, and wherein assigning priorities is based at least in part on whether the first network device is assigned as the primary network device or the secondary network device.

12. The network device of claim 10, wherein assigning a priority to each link in the first port channel comprises determining a set of priorities to be assigned to ports of the first network device; and wherein the processor is further configured to assign one or more of the priorities to a plurality of ports of the first network device, the plurality of ports coupled to the plurality of links of the first port channel.

13. The network device of claim 10, wherein the assigning a priority to each link in the first port channel comprises determining a preestablished criteria to be used in establishing a set of priorities to be assigned to ports of the first network device, and wherein the processor is further configured to:

determine the set of priorities based on the preestablished criteria; and assign the priorities to a plurality of ports of the first network device.

14. The network device of claim 10, wherein assigning a priority to each link in the first port channel comprises assigning a set of unique even numbers or a set of unique odd numbers.

15. The network device of claim 14, wherein assigning of a set of unique even numbers or a set of unique odd numbers is based on whether the first network device is designated as a primary or secondary device.

16. The network device of claim 10, wherein the coordination of the first network device and the second network device produces a virtual port channel complex, the virtual port channel complex communicating with the third network device to form the joint port channel.

17. The network device of claim 10, wherein the processor is further configured to:

respond at the first network device to a failure of one of the active links at the first network device by reassigning the priorities assigned to the links of the first port channel, such that at least one link of the first port channel and at least one link of the second port channel are still assigned active status in the operation of the joint port channel; and after reassigning the priorities assigned to the links of the first port channel, communicate, from the first network device to the third network device, the reassigned priorities.

18. The network device of claim 10, wherein the processor is further configured to:

after a determination is made concerning which links of the joint port channel are to be given active status, the determination based at least in part on the priorities assigned to each link of the joint port channel, respond at the first network device to a failure of one of the active links of the second network device by delaying a synchronization process with the third network device for a predefined time period so that the second network device can use such predefined time period to reassign the priorities assigned to the links of the second port channel and communicate such reassigned priorities of the links of the second channel to the third network device.

19. An apparatus comprising:

means for establishing, at a first network device, a first port channel that forms part of a joint port channel in coordination with a second network device, the first and second network devices having separate control planes, wherein the joint port channel combines a plurality of links of the first port channel with a plurality of links of a second port channel of the second network device, wherein each of the links of the joint port channel are communicatively coupled with ports of a third network device, wherein at least one link of the joint port channel has inactive status, an inactive status link being one that is acting as a back up to one or more active status links, wherein a determination of links of the joint port channel to be given active status is based at least in part on priorities assigned to the links of the joint port channel;

means for assigning, at the first network device, a priority to each link in the first port channel, the priorities assigned such that at least one link of the first port channel and at least one link of the second port channel are assigned active status in the operation of the joint port channel; and means for communicating, from the first network device to the third network device, the priority of each link of the first port channel.

20. At least one non-transitory computer readable storage medium having computer program instructions stored thereon that are arranged to perform the following operations:

establishing, at a first network device, a first port channel that forms part of a joint port channel in coordination with a second network device, the first and second network devices having separate control planes, wherein the joint port channel combines a plurality of links of the first port channel with a plurality of links of a second port channel of the second network device, wherein each of the links of the joint port channel are communicatively coupled with ports of a third network device, wherein at least one link of the joint port channel has inactive status, an inactive status link being one that is acting as a back up to one or more active status links, wherein a determination of links of the joint port channel to be given active status is based at least in part on priorities assigned to the links of the joint port channel;

assigning, at the first network device, a priority to each link in the first port channel, the priorities assigned such that at least one link of the first port channel and at least one link of the second port channel are assigned active status in the operation of the joint port channel; and communicating, from the first network device to the third network device, the priority of each link of the first port channel.

* * * * *